United States Patent
Anderson et al.

(10) Patent No.: US 10,069,746 B2
(45) Date of Patent: *Sep. 4, 2018

(54) REDUCTION OF NETWORK CONGESTION

(71) Applicant: APSI Wifi, LLC, Sandy, UT (US)

(72) Inventors: Chris Anderson, Sandy, UT (US); Jeffrey G. Ballif, Highland, UT (US); Robert B. Vukich, South Jordan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/688,928

(22) Filed: Apr. 16, 2015

(65) Prior Publication Data
US 2016/0191402 A1 Jun. 30, 2016

Related U.S. Application Data

(60) Provisional application No. 61/980,476, filed on Apr. 16, 2014.

(51) Int. Cl.
| H04J 1/16 | (2006.01) |
| H04L 12/811 | (2013.01) |
| H04N 21/24 | (2011.01) |
| H04N 21/647 | (2011.01) |
| H04L 12/801 | (2013.01) |
| H04L 12/825 | (2013.01) |
| H04W 24/08 | (2009.01) |
| H04L 12/26 | (2006.01) |
| H04L 29/06 | (2006.01) |
| H04W 28/02 | (2009.01) |
| H04L 1/00 | (2006.01) |

(52) U.S. Cl.
CPC .......... *H04L 47/38* (2013.01); *H04L 43/0829* (2013.01); *H04L 43/0888* (2013.01); *H04L 43/16* (2013.01); *H04L 47/11* (2013.01); *H04L 47/12* (2013.01); *H04L 47/25* (2013.01); *H04L 67/42* (2013.01); *H04N 21/2402* (2013.01); *H04N 21/64738* (2013.01); *H04W 24/08* (2013.01); *H04L 1/0076* (2013.01); *H04W 28/02* (2013.01)

(58) Field of Classification Search
None
See application file for complete search history.

(56) References Cited

U.S. PATENT DOCUMENTS

| 6,292,834 B1 | 9/2001 | Ravi et al. |
| 2006/0224760 A1 | 10/2006 | Yu et al. |
| 2007/0115814 A1 | 5/2007 | Gerla et al. |
| 2007/0115840 A1 | 5/2007 | Feick et al. |
| 2011/0216648 A1 | 9/2011 | Mehrotra et al. |
| 2011/0243324 A1 | 10/2011 | Lima et al. |
| 2012/0054583 A1* | 3/2012 | Park .................. H03M 13/3761 714/776 |

(Continued)

*Primary Examiner* — Willie J Daniel, Jr.
(74) *Attorney, Agent, or Firm* — Thorpe North & Western, LLP (57) ABSTRACT

A technology is provided for reducing network congestion. A data loss rate pertaining to a datastream between a client and a server may be determined. The datastream may comprise data packets sent and received between the client and the server. The client and the server may send to and receive from each other data packets encoded using random linear network coding (RLNC) in response to determining that the data loss rate is higher than or equal to a threshold.

17 Claims, 8 Drawing Sheets

(56) References Cited

U.S. PATENT DOCUMENTS

| | | |
|---|---|---|
| 2012/0188934 A1 | 7/2012 | Liu et al. |
| 2013/0114481 A1 | 5/2013 | Kim et al. |
| 2014/0269485 A1* | 9/2014 | Medard .................. H04W 4/06 370/312 |
| 2016/0134546 A1* | 5/2016 | Anderson ............... H04L 47/12 370/235 |

* cited by examiner

REDUCTION OF NETWORK CONGESTION

CROSS-REFERENCE TO RELATED APPLICATION

This application claims the benefit of U.S. provisional patent application Ser. No. 61/980,476, filed Apr. 16, 2014, titled "Apparatus, System, and Method for Reducing Network Congestion," the entirety of which is incorporated by reference herein.

BACKGROUND

Communications across computer networks have become a widely available form of communications. The communications can be between many forms of computing devices, including: mobile devices, servers, clients to servers, game consoles, desktop computers, laptops and a myriad of other computing devices. The form of data being sent in these communications usually takes the form of packets that are transmitted between the computing devices.

Data may be transmitted through the internet using packets or chunks of information. Packet formatting and the method for delivering packets across the internet are governed by the protocol known as TCP/IP (transmission control protocol/internet protocol). For a TCP data transmission to be completed, the recipient TCP layer may collect the packets and organize the packets in the order in which the packets were sent. If a packet is lost, the protocol interprets this as a sign that the network is congested—the transmission speed is immediately halved, and from there the packets speed attempts to increase again at a slow rate. This is beneficial in some situations and inefficient in other situation. Unfortunately, TCP the protocol does not have the intelligence to know how to otherwise address problems in network congestion.

DETAILED DESCRIPTION

A technology is provided for reducing network congestion through selective use of RLNC (random linear network coding) encoding. A data loss rate pertaining to a datastream between a client and a server may be determined. The datastream may comprise data packets sent and received between the client and the server. The client and the server may send and receive data packets to and from each other, which are encoded using random linear network coding (RLNC) in response to determining that the data loss rate is higher than or equal to a first threshold.

Figure 1A:
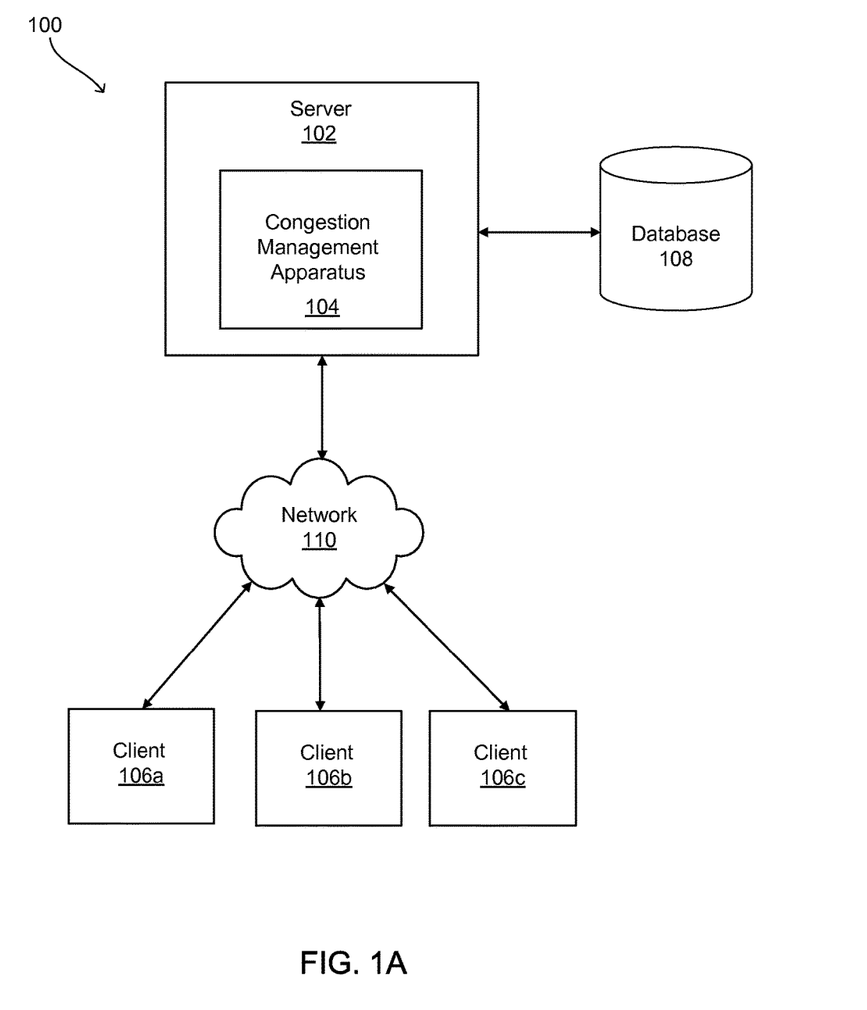
FIG. 1A is a block diagram illustrating an example of a system for managing congestion in a computer network in a client-to-server configuration.

FIG. 1A is a schematic block diagram illustrating one high level configuration of a system for reducing network congestion through the use of random linear network coding. The system 100 includes a server 102 with a congestion management apparatus 104 (e.g., a congestion management module controlled and/or executed by at least one processor device) connected to multiple clients 106a-c (collectively, 106) through a network 110, and a database 108, which are described further below.

The system 100 includes clients 106a-c in communication with a server 102 having a congestion management apparatus 104 through a network 110. The server 102 may be any computer accessible by a client 106 over a network 110, including but not limited to a gateway, router, mainframe server, or proxy server. For example, the server 102 can be a gateway that connects the client 106 to the Internet, cloud-based servers, or another client 106. The network 110 connecting the server 102 and the client 106 may include a local area network ("LAN"), a wide area network ("WAN"), a wireless network, a cellular network, the internet, or the like. The database 108 may be any form of data storage, including but not limited to a relational database or a flat file. The database 108 can be hosted on the server 102 or a separate server. The congestion management apparatus 104 may reside solely on server 102 or may be spread across several servers. In one embodiment, the congestion management apparatus 104 resides in part on the server 102 and in part on the client 106. In another embodiment, the congestion management apparatus 104 resides in part on the server, in part on the client 106, and also in part on a different server hosting the database 108. The congestion management apparatus 104 is described in more detail with respect to the apparatus 200 in FIG. 2.

The client 106 may be an electronic device or a software application running on a electronic device (e.g., a mobile electronic device). The client(s) 106a-c as an electronic device may be a smartphone, a tablet computer, a laptop computer, a desktop computer, mobile device, a server, a digital media player (e.g., Apple TV), a network appliance, a gaming console (e.g., PlayStation, Xbox, Wii) or the like. The client 106 as a software application may include a VPN (virtual private network) client and/or an application running on a mobile electronic device.

The client 106 is capable of encoding data packets using random linear network coding and is capable of sending and receiving these data packets, as well as receiving and decoding data packets encoded using random linear network coding. Random linear network coding enables (i) a receiver (e.g., the server 102 or the client 106) to ignore lost data packets sent by the transmitter (e.g., the server 102 or the client 106) and acknowledge the receipt of certain data packets and (ii) a transmitter to avoid retransmitting data packets, thus reducing network congestion, and is explained further below with respect to FIG. 2.

Figure 1B:
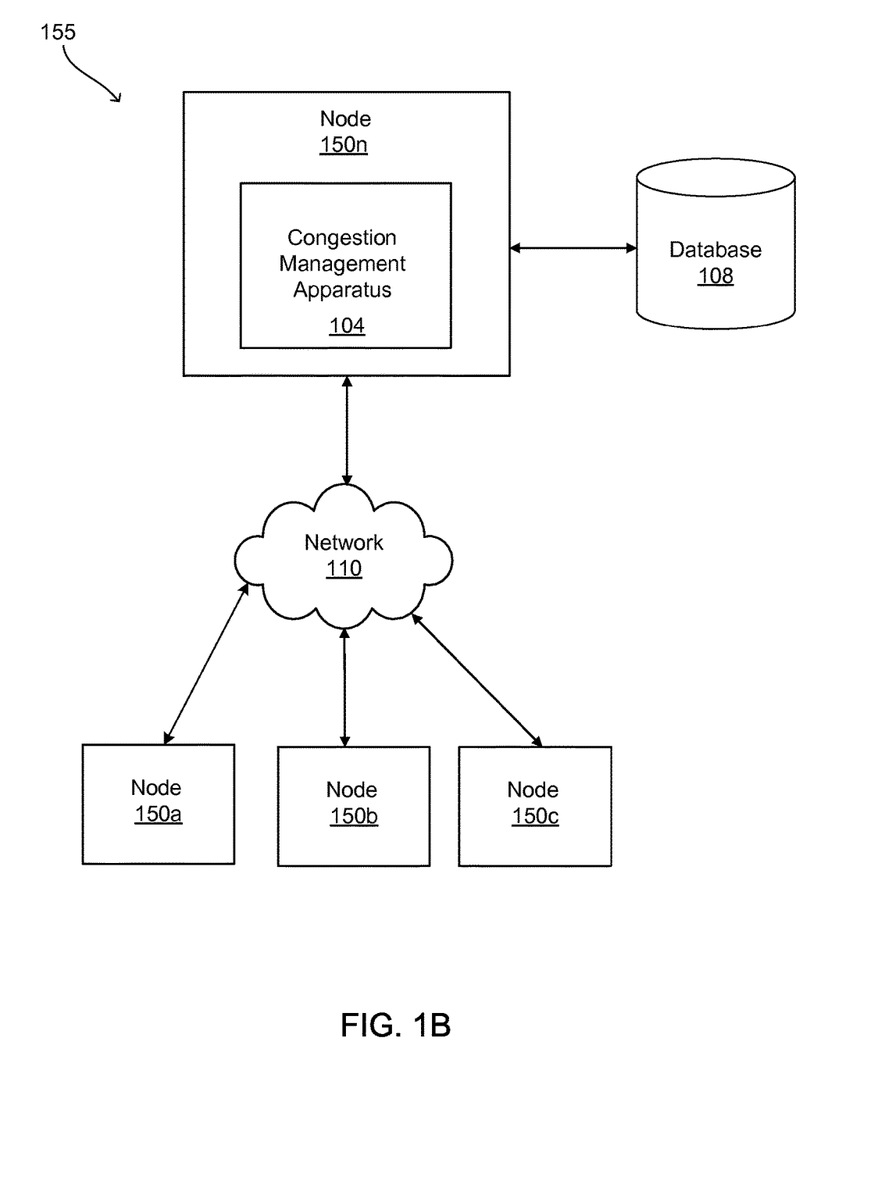
FIG. 1B is a block diagram illustrating an additional example of a system for managing congestion in a computer network in a node-to-node configuration.

FIG. 1B is a schematic block diagram illustrating an additional high level configuration of a system for reducing network congestion through the use of random linear network coding in a node-to-node configuration. The system 155 includes a congestion management apparatus 104 (e.g., a congestion management module), multiple nodes 150a-n (collectively, 150), a network 110, and the database 108. In one embodiment, the congestion management apparatus 104 may include and/or be controlled by at least one processor device and memory device. The congestion management apparatus 104 may reside solely on at least one node 150, such as node 150n, or may be spread across several nodes 150a-c. The congestion management module and each of the multiple nodes 150a-c may be connected to each other through the network 110. In one embodiment, the network 110 may include wireless networking and communication using one or more wireless communication configurations. For example, the node 150a may communicate with the congestion management apparatus 104 on node 150n, and also the database 108, via the network 110 using wireless communication and devices, such as a WiFi device, Bluetooth device, a wireless router, a wireless modem, or another wireless device.

In one embodiment, each of the nodes 150 may be a similar computing device and/or one or more of the nodes 150 may different computing devices. For example, each of the nodes 150 may be a smart phone. Alternatively, for example, node 150n may be a smart phone, node 150a may be a computing tablet device, node 150b may be a laptop computer, and/or node 150c may be a personal computer, or another type of computing system or device.

Figure 1C:
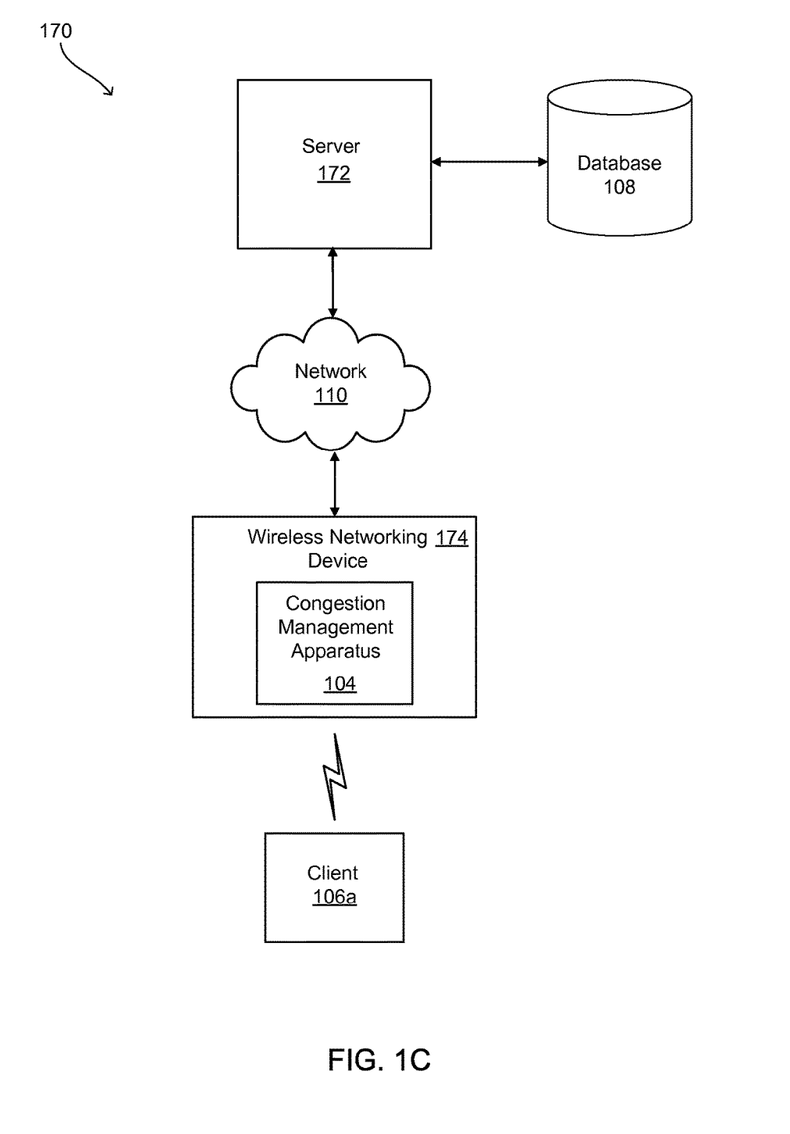
FIG. 1C is a block diagram illustrating an example of a system for managing congestion in a computer network in a client-to-server configuration utilizing wireless networking and communication.

FIG. 1C is a schematic block diagram illustrating an alternative high level configuration of a system for reducing network congestion through the use of random linear network coding in communications between a wireless networking device 174 and a client 106a. For example, the wireless networking device 174 may be a WiFi device, Bluetooth device, a wireless router, a wireless modem, or another wireless device. The system 170 includes a congestion management apparatus 104 (e.g., a congestion management module), clients 106a, a network 110, and the database 108. In one embodiment, the congestion management apparatus 104 may include and/or be controlled by at least one of the processor device and memory device. The congestion management apparatus 104 may reside on the wireless networking device 174 in order to provide error correction and improve the wireless communications. A portion of the congestion management apparatus 104 may be split across nodes and a portion may reside on the wireless networking device 174 and a portion may reside on the client 106a. The wireless networking device 174 and the server 172 may be connected to each other through the network 110.

Figure 2:
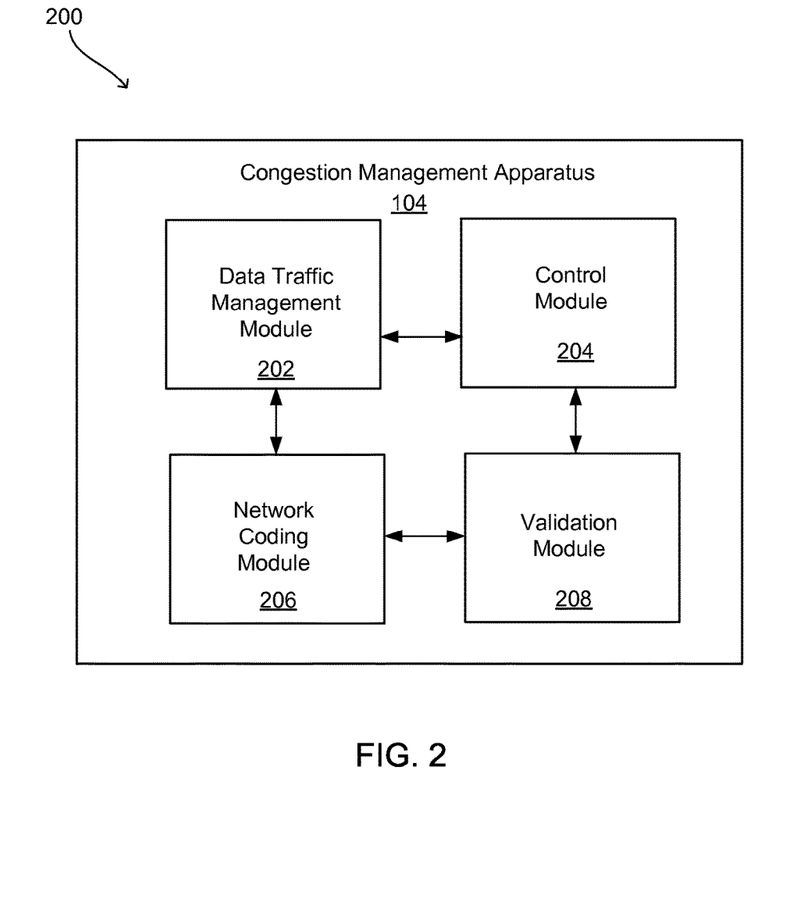
FIG. 2 is a block diagram illustrating an example of details of a congestion management apparatus.

FIG. 2 is a schematic block diagram illustrating one embodiment of an apparatus 200 for reducing network congestion through the use of random linear network coding. The apparatus 200 may include or may be the congestion management apparatus 104. The apparatus 200 may include a data traffic measurement module 202, a control module 204, a network coding module 206, and a validation module 208, which are described below. In one embodiment, the data traffic measurement module 202, the control module 204, the network coding module 206, and the validation module 208 may each include at least one processor device and/or memory. Alternatively, the data traffic measurement module 202, the control module 204, the network coding module 206, and the validation module 208 may each share one or more processor devices and/or be controlled by one or more processor devices of the congestion management apparatus 104, the server 102, and/or the client 106. It will be apparent to those skilled in the art that other processing and memory implementations, including various non-transitory computer readable storage media, may be used for storing and executing program instructions pertaining to the technique introduced herein, such as such as magnetic disk or tape, optical disk (e.g., CD-ROM or DVD), flash memory, solid-state disk (SSD), electronic random access memory (RAM), micro-electro mechanical and/or any other similar media adapted to store information.

In one embodiment, the data traffic measurement module 202, the control module 204, the network coding module 206, and the validation module 208 may each be in communication with each other, and communication may occur over one or more types of communication frameworks or communication networks. The congestion management apparatus 104 may include, for example, mechanical, electrical and signaling circuitry needed to connect the data traffic measurement module 202, the control module 204, the network coding module 206, and the validation module 208 to each other for communication and for sending and/or receiving data. In one embodiment, the data traffic measurement module 202, the control module 204, the network coding module 206, and the validation module 208 may each include a processor device and memory, and/or be controlled by a processor device and memory (see FIG. 6).

The data traffic measurement module 202 analyzes and/or determines a data loss rate pertaining to a datastream between the server and the client. A datastream includes data packets sent and received between the server and the client. In one embodiment, the data traffic measurement module 202 can simultaneously determine the data loss rate pertaining to multiple datastreams between the server and multiple clients. The data loss rate pertaining to a datastream may be defined in different ways. In one embodiment, the data loss rate is the total number of data packets sent by either (i) the server 102, (ii) the client 106, or (iii) both the server 102 and the client 106, but not received by the server 102 and/or the client 106 over a set period of time. For example, the data loss rate may be, during a one second interval, the total number of data packets sent by the client 106 to the server 102 that were not received by the server 102. In another embodiment, the data loss rate is the total number of data packets resent by (i) the server 102, (ii) the client 106, or (iii) both the server 102 and the client 106 over a set period of time. An example of the data loss rate using this definition may be, during a one second interval, the total number of data packets resent by server 102 to the client 106.

A data loss rate above a certain threshold has an adverse impact on the performance of real-time software applications running on the server 102 and/or the client 106, including but not limited to video teleconferencing, video streaming, and graphic and network heavy online multi-player games. Thus, measuring the data loss rate between the server 102 and the client 106 can help identify when network congestion is severely impairing the functionality of these applications. To more accurately measure the average data loss rate between the server 102 and the client 106, it will be advantageous to vary the window of time during which the data traffic measurement module 202 counts the total number of data packets lost, was asked to retransmit packets, or packets were resent. Thus, for example, the data traffic measurement module 202 may count the total number of data packets lost between the server 102 and the client 106 over a five second interval. A longer sampling window gives the congestion management apparatus 104 a better understanding of the state of congestion within the network between the server 102 and the client 106 by better averaging the impact of momentary spikes or dips in network congestion. A shorter sampling window allows the congestion management apparatus 104 to more quickly react to changes in network congestion.

The data traffic measurement module 202 may determine the data loss rate pertaining to a datastream between the server 102 and the client 106 either continuously, at regular intervals (e.g., every 30 seconds), and/or at scheduled times (e.g., during peak network usage hours). Determining the data loss rate pertaining to a datastream continuously allows the data traffic measurement module 202 to maintain a moving window average of the data loss rate. For example, the data loss rate determined by the data traffic measurement module 202 may be the average of the most recent three data loss rates measured. In another example, the data loss rate determined by the data traffic measurement module 202 may be the weighted average of the most recent five data loss rates measured, with the more recently measured data loss rates weighted more heavily.

The control module 204 causes the server 102 and the client 106 to send and receive data packets from each other and the packets are encoded using random linear network coding. In one embodiment, the control module 204 causes the server 102 and the client 106 to send and receive data packets from each other, and the data packets can be encoded using random linear network coding in response to the data traffic measurement module 302 determining that the data loss rate is higher than or equal to a first threshold. The control module 204 also causes the server 102 and the client 106 to stop sending and receiving data packets encoded using random linear network coding between each other. In an embodiment, the control module 204 causes the server 102 and the client 106 to stop sending and receiving data packets encoded using random linear network coding between each other in response to the data traffic measurement module 202 determining that the data loss rate is lower than a second threshold (e.g., at least one additional threshold). In one embodiment, depending on configuration, additional thresholds may also be utilized and/or the data traffic measurement module 202 may determine that the data loss rate is lower than a at least one of the additional thresholds. Furthermore, in a particular case, the first threshold and second threshold may be the same threshold point but the first and second thresholds will more often be two separate thresholds.

In one embodiment, the first threshold and the second threshold are identical. But in another embodiment, the first threshold and the second threshold are different, with the first threshold greater than the second threshold. As explained further below, encoding data packets using random linear network coding increases overhead in terms of both packet header size and time spent encoding and decoding packet payloads. Thus, in certain scenarios, encoding data packets using random linear network coding will actually increase network congestion and result in lower data throughput rates. The first threshold and the second threshold should preferably be set to data loss rates that balance their effect on the performance of real-time software applications with maintaining the highest data throughput rates. That is, the first threshold and the second threshold may be dynamically and/or automatically adjusted and/or set to data loss rates for real-time load balancing of the various modules or applications of the server 102 and/or client 106 while maintaining the highest data throughput rates between the server 102 and the client 106.

For example, assuming that a data loss rate above 20 packets per second will result in choppy video streaming between the server 102 and the client 106, the first threshold may be set to 18 or 19 packets per second so that a higher data loss rate will cause the server 102 and the client 106 to encode data packets using random linear network encoding. In this example, the second threshold may be identical to the first threshold, or it may be set at a lower threshold to maintain a higher data throughput between the server 102 and the client 106.

The network coding module 206 encodes data packets using random linear network coding and decodes data packets encoded using random linear network coding. Traditional TCP/IP transmission divides data content into sequentially numbered packets and sends each packet with its accompanying sequence number. If a packet (i) does not arrive at its destination and therefore an acknowledgement is not sent to the origin or (ii) an acknowledgement is sent but does not arrive at the origin within a specific window of time, the packet is resent. In random linear network coding, data are divided into data blocks and encoded into coded data packets. Each coded data packet is formed by multiplying each data block with a constant chosen randomly from a finite range of constants and then combining the results. Thus, each coded data packet can be represented by a linear equation in the following form:

$$CDP1 = C_{1,1} \times DB_{1,1} + C_{1,2} \times DB_{1,2} + \ldots + C_{1,m} \times DB_{1,m}$$

$$CDP2 = C_{2,1} \times DB_{2,1} + C_{2,2} \times DB_{2,2} + \ldots + C_{2,m} \times DB_{2,m}$$

$$CDP\ k = C_{k,1} \times DB_{k,1} + C_{k,2} \times DB_{k,2} + \ldots + C_{k,m} \times DB_{k,m}$$

Here, CDP represents a "coded data packet," DB represents a "data block," and C represents a randomly chosen constant from a finite range of constants.

The randomly chosen constant $C_{k,m}$ multiplied with each data block are encoded in the headers of the coded data packets in which they are used. Assuming there are n data blocks to be sent, coded data packets are sent continuously until n distinct (i.e., linearly independent) coded data packets are received and acknowledged. Once n distinct coded data packets are received, they can be decoded to find the n data blocks. Alternatively, some individual coded data packets can be decoded as they are received. For example, given m distinct coded data packets encoded using a total of p unique data blocks, where m≥p, it is possible to decode the m coded data packets to find the p data blocks.

The number of data blocks used to encode a coded data packet can vary. In certain situations, it is advantageous to encode a coded data packet with a larger set of data blocks (i.e., a larger number of data blocks). For example, when the data loss rate in the network 110 reaches a certain threshold, encoding a coded data packet with a larger set of data blocks is desirable because each distinct coded data packet received will contain more data blocks that can be decoded. Thus, in one embodiment, the network coding module 206 increases the number of data blocks used to encode a coded data packet in response to the data traffic measurement module 202 determining that the data loss rate is higher than the first threshold. In other situations, it is advantageous to encode a coded data packet with a smaller set of data blocks (i.e., a smaller number of data blocks). An increase in the number of encoded data blocks leads to an increase in packet header size (due to a corresponding increase in the number of constants $C_{k,m}$ encoded in the packet header) and packet payload size, as well as increases in time required to encode and decode the coded data packets. Thus, when the data loss rate in the network 110 is very low, encoding a coded data packet with a smaller set of data blocks is desirable because it reduces the overhead associated with encoding a larger number of data blocks. Thus, in one embodiment, the network coding module 206 decreases the number of data blocks used to encode a coded data packet in response to the data traffic measurement module 202 determining that the data loss rate is between the first threshold and the second threshold.

As explained above, random linear network coding adds overhead in terms of time required to encode and decode the coded data packets, as well as an increase in the size of the coded data packet header to include the randomly chosen constants. But the overhead incurred is typically small compared to the efficiency gained by the transmitter (e.g., the server 102 or the client 106) not having to retransmit lost coded data packets and the receiver (e.g., the server 102 or the client 106) only having to acknowledge the receipt of every distinct coded data packet. Since it is possible that not all coded data packets created by random linear network coding are distinct, the transmitter may have to send more than n coded data packets in order for n distinct coded data packets to be received. Thus, if network congestion is low and there is very little to no packet loss, sending coded data packets encoded using random linear network coding may use more network bandwidth compared to encoding and sending data packets using the traditional TCP/IP transmission protocol.

The validation module 208 authenticates the client 106 and determines whether the client 106 possesses valid authorization to encode and decode data packets using random linear network encoding. In one embodiment, the control module 204 causes the server 102 and the client 106 to send to and receive from each other data packets encoded using random linear network coding in response to the validation module 208 authenticating the client 106 and determining that the client 106 possesses valid authorization. The database 108 stores a unique identifier for each client 106. This identifier can be a unique alphanumeric code, picture, or other authentication token. For example, the stored identifier may be an encrypted hash of a client's 106 MAC address. The database 108 also stores an indicator of whether the client 106 is authorized to encode or decode data packets using random linear network coding. In another embodiment, the control module 204 causes the server 102 and the client 106 to stop sending and receiving data packets encoded using random linear network coding between each other in response to the validation module 208 determining that the client 106 lacks valid authorization.

Figure 3:
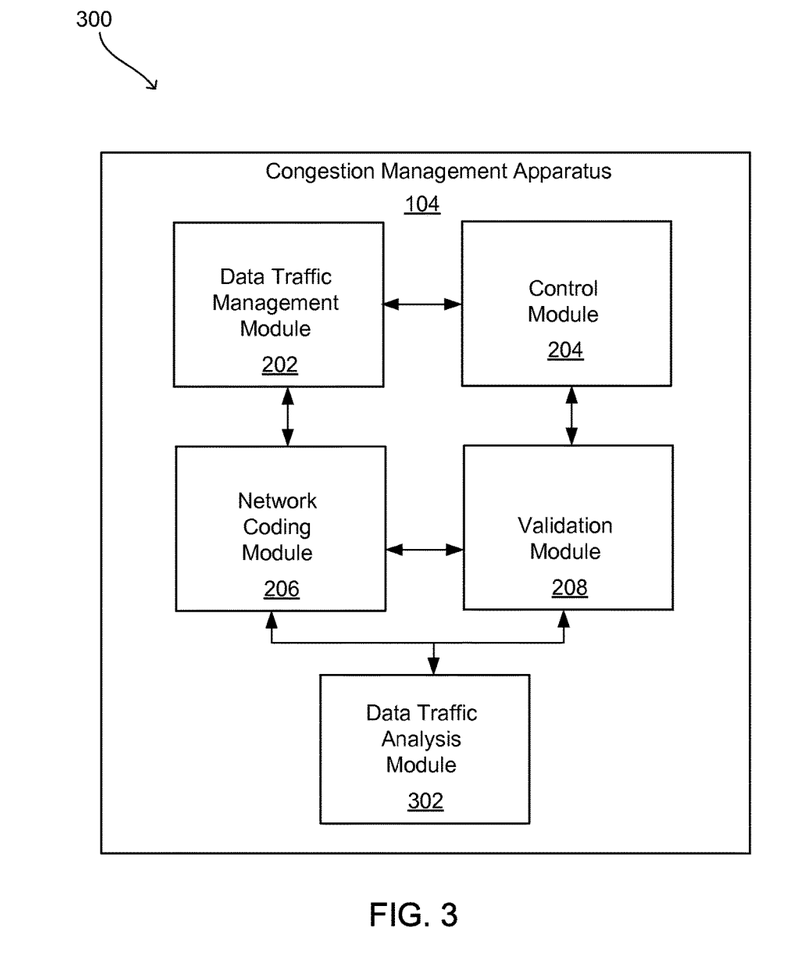
FIG. 3 is block diagram illustrating an example of a congestion management apparatus with a data traffic analysis module.

FIG. 3 is a schematic block diagram illustrating another embodiment of an apparatus for reducing network congestion through the use of random linear network coding. The apparatus 300 includes a data traffic measurement module 202, a control module 204, a network coding module 206, a validation module 208, and a data traffic analysis module 302. The data traffic measurement module 202, the control module 204, the network coding module 206, the validation module 208, and the data traffic analysis module 302 have been described above. The data traffic measurement module 202, the control module 204, the network coding module 206, the validation module 208, and the data traffic analysis module 302 may each include at least one processor device and/or memory. Alternatively, the data traffic measurement module 202, the control module 204, the network coding module 206, the validation module 208, and the data traffic analysis module 302 may each share one or more processor devices and/or be controlled by one or more processor devices of the congestion management apparatus 104, the server 102, and/or the client 106. It will be apparent to those skilled in the art that other processing and memory implementations, including various non-transitory computer readable storage media, may be used for storing and executing program instructions pertaining to the technique introduced herein, such as such as magnetic disk or tape, optical disk (e.g., CD-ROM or DVD), flash memory, solid-state disk (SSD), electronic random access memory (RAM), micro-electro mechanical and/or any other similar media adapted to store information.

In one embodiment, the data traffic measurement module 202, the control module 204, the network coding module 206, the validation module 208, and the data traffic analysis module 302 may each be in communication with each other, and communication may occur over one or more types of communication frameworks or communication networks. The congestion management apparatus 104 may include, for example, mechanical, electrical and signaling circuitry needed to connect the data traffic measurement module 202, the control module 204, the network coding module 206, the validation module 208, and the data traffic analysis module 302 to each other for communication and/or sending and/or receiving data.

The data traffic analysis module 302 records one or more characteristics of the datastream between the server 102 and the client 106. A characteristic of the datastream between the server 102 and the client 106 is the data loss rate pertaining to the datastream at various times (e.g., 8 a.m. to 5 p.m., day, week, month, Mondays, weekends, New Year's Day). Another characteristic of the datastream between the server 102 and the client 106 is the rate of change in the data loss rate pertaining to the datastream at various times. Yet another characteristic of the datastream between the server 102 and the client 106 is the data throughput rate pertaining to the datastream at various times. Still another characteristic of the datastream between the server 102 and the client 106 is the rate of change in the data throughput rate pertaining to the datastream at various times.

The one or more characteristics of the datastream between the server 102 and the client 106 may be stored in the database 108 and/or on the server 102 and allows other modules to leverage the one or more recorded datastream characteristics to provide additional functionality for the congestion management apparatus 104. In one embodiment, the data traffic measurement module 202 changes the manner and/or frequency with which it determines the data loss rate for the datastream based upon an analysis of the one or more characteristics of the datastream recorded by the data traffic analysis module 302. For example, the data traffic measurement module 202 may analyze the one or more characteristics of the datastream between the server 102 and a particular client 102 recorded by the data traffic analysis module 302 and determine that the datastream's data loss rate during a certain time (e.g., midnight to 5 a.m.) is consistently low. As a result, the data traffic measurement module 202 may lengthen the sampling window for measuring the data loss rate and also lengthen the interval between the times when it determines the data loss rate during that time. In another example, the data traffic measurement module 202 may analyze the one or more characteristics of the datastream between the server 102 and another client 102 recorded by the data traffic analysis module 302 and determine that the datastream's data loss rate varies greatly during a specific time of day (e.g., noon to 3 p.m.). In response, the data traffic measurement module 202 may shorten the sampling window for measuring the data loss rate and also continuously monitor the data loss rate during that time.

In another embodiment, the control module 204 causes the server 102 and the client 106 to send to and receive from each other data packets encoded using random linear network coding in response to an analysis of the one or more characteristics of the datastream recorded by the data traffic analysis module 302. In an additional embodiment, the control module 204 causes the server 102 and the client 106 to stop sending and receiving data packets encoded using random linear network coding between each other in response to an analysis of the one or more characteristics of the datastream recorded by the data traffic analysis module 302. For example, the control module 204 may analyze the one or more characteristics of the datastream between the server 102 and the client 106 recorded by the data traffic analysis module 302 and determine that a datastream's data loss rate, as well as the rate of change of the data loss rate, is low during a certain time of day (e.g., 8 a.m. to 3 p.m.). In response, the control module 204 may cause the server 102 and the client 106 to stop sending and receiving data packets encoded using random linear network coding between each other during that time.

Figure 4:
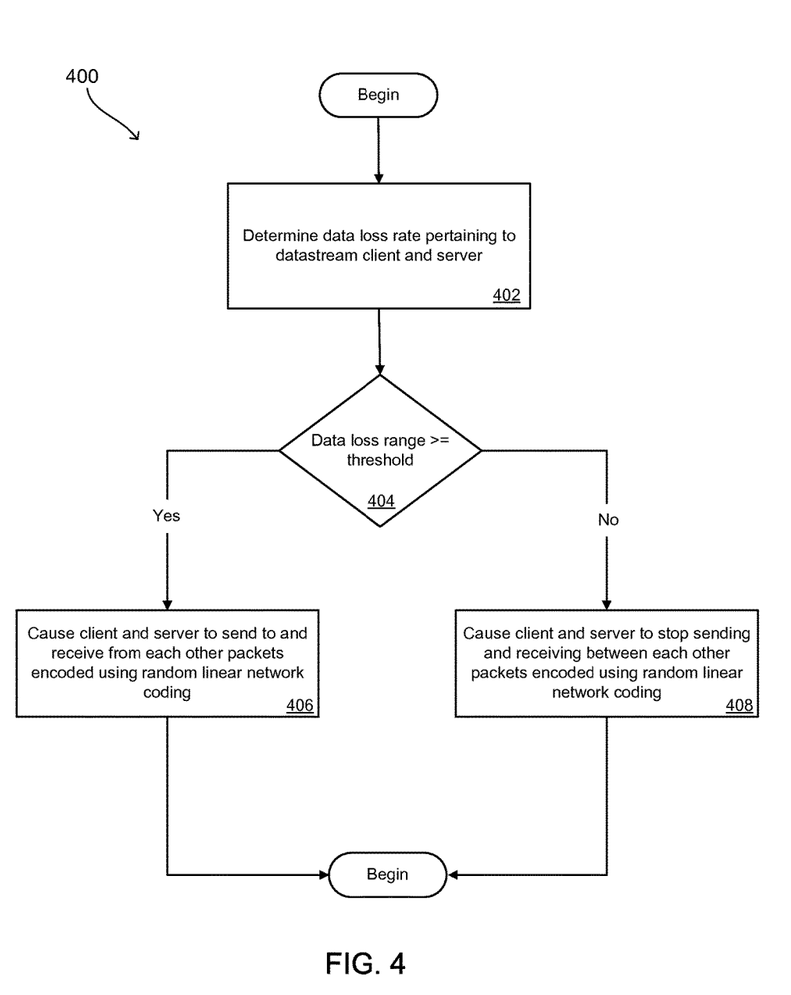
FIG. 4 is a flowchart illustrating an example of checking a data loss range against a threshold to determine whether to apply RLNC (random linear network coding).

FIG. 4 is a flow chart diagram illustrating one embodiment of a method for reducing network congestion through the use of random linear network coding. The method 400 begins and determines 402 the data loss rate pertaining to a datastream between a server 102 and a client 106. The method 400 determines 404 whether the data loss rate is greater than or equal to a threshold. If the data loss rate is greater than or equal to the threshold, the method 400 causes 406 the server 102 and the client 106 to send to and receive from each other data packets encoded using random linear network coding and the method 400 ends. If the data loss rate is not greater than or equal to the threshold, the method 400 causes 408 the server 102 and the client 106 to stop sending and receiving data packets encoded using random linear network coding between each other and the method 400 ends. Thus, the congestion management apparatus 104 is configured to selectively "turn on" and/or selectively "turn off" in real time the random linear network coding on datapackets by determining whether the data loss rate is greater than or equal to a threshold.

Figure 5:
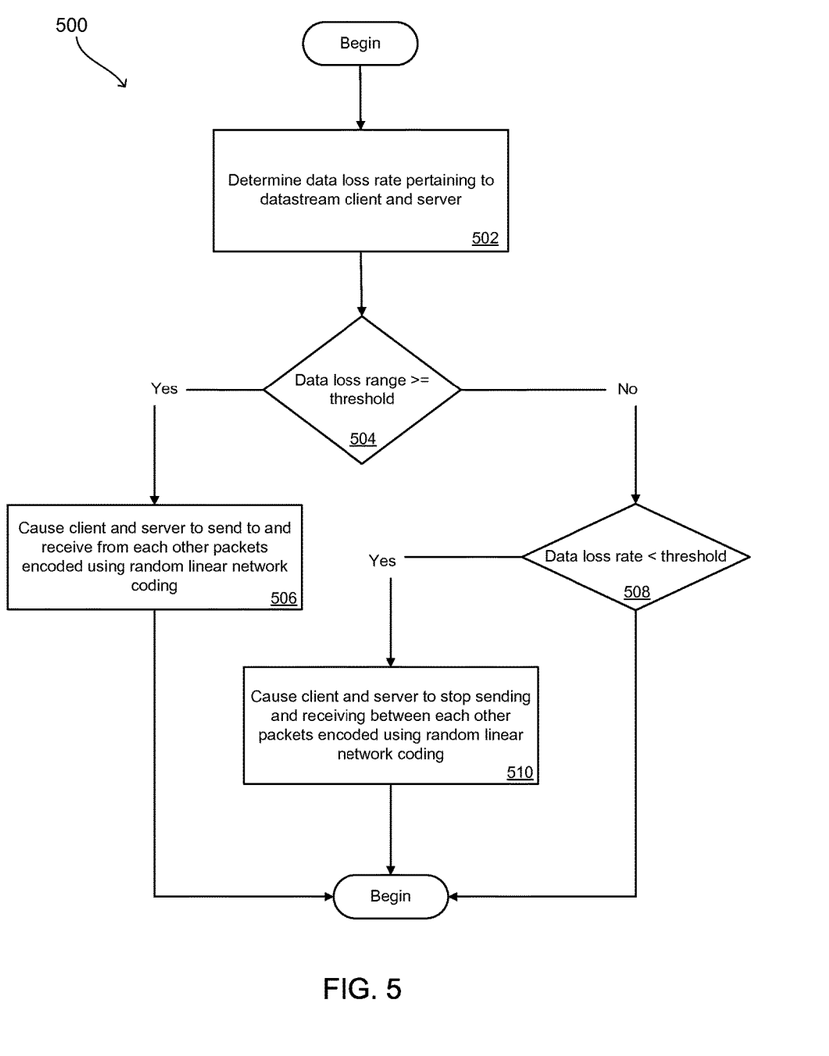
FIG. 5 is a flowchart illustrating an example of checking a data loss range against two thresholds to determine whether to apply RLNC (random linear network coding).

FIG. 5 is a schematic flow chart diagram illustrating another embodiment of a method for reducing network congestion through the use of random linear network coding. The method 500 begins and determines 502 the data loss rate pertaining to a datastream between a server 102 and a client 106. The method 500 determines 504 whether the data loss rate is greater than or equal to a first threshold. If the data loss rate is greater than or equal to the first threshold, the method 500 causes 506 the server 102 and the client 106 to send to and receive from each other data packets encoded using random linear network coding and the method 500 ends. If the data loss rate is not greater than or equal to the first threshold, the method 500 determines 508 whether the data loss rate is less than a second threshold. In one embodiment, the first threshold and the second threshold are different, with the first threshold higher than the second threshold. If the data loss rate is less than the second threshold, the method 500 causes 510 the server 102 and the client 106 to stop sending and receiving data packets encoded using random linear network coding between each other and the method 500 ends. If the data loss rate is not less than the second threshold, the method 500 ends. Thus, the congestion management apparatus 104 is configured to selectively "turn on" and/or selectively "turn off" in real time the random linear network coding on datapackets by based on the data loss rate being either greater than or equal to either a first threshold and/or less than a second threshold.

Figure 6:
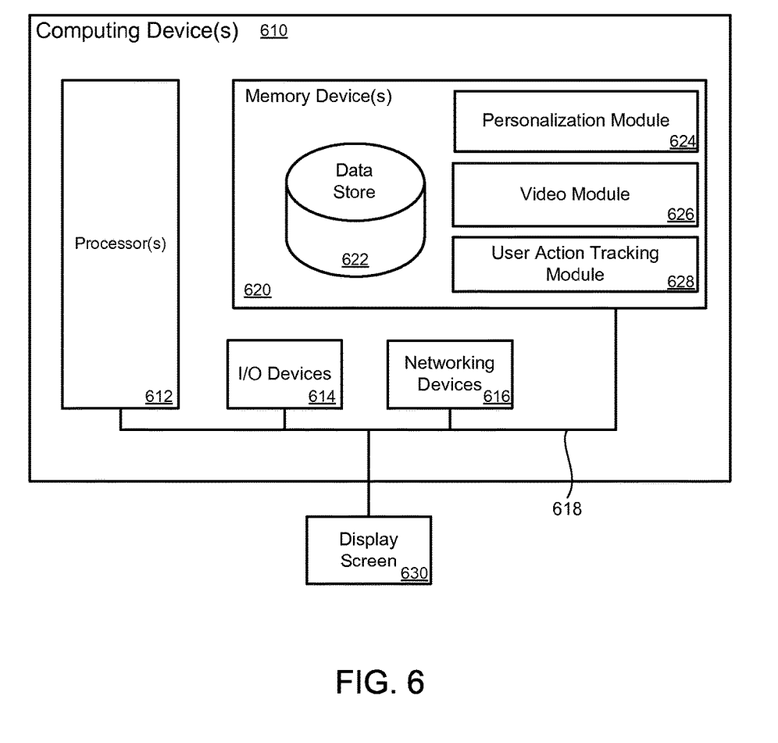
FIG. 6 is block diagram illustrating an example of a computing device for reducing network congestion through selective use of RLNC (random linear network coding) encoding.

FIG. 6 illustrates a computing device 610 on which modules of this technology may execute. A computing device 610 is illustrated on which a high level example of the technology may be executed. The computing device 610 may include one or more processors 612 that are in communication with memory devices 620. The computing device may include a local communication interface 618 for the components in the computing device. For example, the local communication interface may be a local data bus and/or any related address or control busses as may be desired.

The memory device 620 may contain modules that are executable by the processor(s) 612 and data for the modules. Located in the memory device 620 are modules executable by the processor. For example, a personalization module 624, the video module 626, and the user action module 628, and other modules may be located in the memory device 620. The modules may execute the functions described earlier. A data store 622 may also be located in the memory device 620 for storing data related to the modules and other applications along with an operating system that is executable by the processor(s) 612.

Other applications may also be stored in the memory device 620 and may be executable by the processor(s) 612. Components or modules discussed in this description that may be implemented in the form of software using high programming level languages that are compiled, interpreted or executed using a hybrid of the methods.

The computing device may also have access to I/O (input/output) devices 614 that are usable by the computing devices. An example of an I/O device is a display screen 630 that is available to display output from the computing devices. Other known I/O device may be used with the computing device as desired. Networking devices 616 and similar communication devices may be included in the computing device. The networking devices 616 may be wired or wireless networking devices that connect to the internet, a LAN, WAN, or other computing network.

The components or modules that are shown as being stored in the memory device 620 may be executed by the processor 612. The term "executable" may mean a program file that is in a form that may be executed by a processor 612. For example, a program in a higher level language may be compiled into machine code in a format that may be loaded into a random access portion of the memory device 620 and executed by the processor 612, or source code may be loaded by another executable program and interpreted to generate instructions in a random access portion of the memory to be executed by a processor. The executable program may be stored in any portion or component of the memory device 620. For example, the memory device 620 may be random access memory (RAM), read only memory (ROM), flash memory, a solid state drive, memory card, a hard drive, optical disk, floppy disk, magnetic tape, or any other memory components.

The processor 612 may represent multiple processors and the memory 620 may represent multiple memory units that operate in parallel to the processing circuits. This may provide parallel processing channels for the processes and data in the system. The local interface 618 may be used as a network to facilitate communication between any of the multiple processors and multiple memories. The local interface 618 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. An apparatus for reducing network congestion, the apparatus comprising:
    at least one processor device and memory device;
    a data traffic measurement module, controlled by the at least one processor device, that determines a data loss rate for a datastream between a client and a server, wherein the datastream comprises data packets sent and received between the client and the server; and
    a control module, controlled by the at least one processor device, that causes the client and the server to:
        send and receive data packets to and from each other which are encoded using random linear network coding in response to the data traffic measurement module determining that the data loss rate is higher than or equal to a first threshold; and
        stop sending and receiving data packets encoded using random linear network coding between each other in response to the data traffic measurement module determining that the data loss rate is lower than a second threshold, wherein the first threshold and the second threshold are set to data loss rates that balance performance of applications with maintaining higher data throughput rates,
    wherein at least a portion of the data traffic measurement module and the control module comprise one or more of hardware and executable code, the executable code stored on one or more non-transitory computer readable storage media and executed by the at least one processor device.

2. The apparatus of claim 1, wherein the first threshold is greater than the second threshold.

3. The apparatus of claim 1, further comprising a validation module that determines whether the client possesses valid authorization, and the control module causes the client and the server to send and receive data packets encoded using random linear network coding to each other in response to the validation module determining that the client possesses valid authorization.

4. The apparatus of claim 3, wherein the control module further causes the client and server to stop sending and receiving data packets encoded using random linear network coding between each other in response to the validation module determining that the client lacks valid authorization.

5. The apparatus of claim 1, further comprising a data traffic analysis module that records one or more characteristics of the datastream between the client and the server.

6. A method for reducing network congestion, the method executed by at least one processor device, comprising:
   determining a data loss rate of a datastream between a first node and a second node, wherein the datastream comprises data packets sent and received on a network between the first node and the second node;
   causing the first node and the second node to send to and receive from each other data packets encoded using random linear network coding in response to determining that the data loss rate is higher than or equal to a first threshold; and
   causing the first node and the second node to stop sending and receiving data packets encoded using random linear network coding between each other in response to determining that the data loss rate is lower than at least one additional threshold, wherein the first threshold and the one additional threshold are set to data loss rates that balance performance of applications with maintaining higher data throughput rates.

7. The method of claim 6, wherein the first threshold is greater than the at least one additional threshold.

8. The method of claim 6, further comprising determining whether the first node possesses valid authorization, and causing the first node and the second node to send and receive data packets encoded using random linear network coding to each other in response to determining that the first node possesses valid authorization.

9. The method of claim 8, further comprising causing the first node and the second node to stop sending and receiving data packets encoded using random linear network coding between each other in response to determining that the first node lacks valid authorization.

10. The method of claim 6, further comprising recording one or more characteristics of the datastream between the first node and the second node, the one or more characteristics of the datastream, including at least one of: a data loss rate at one or more time periods, data throughput rate, or a rate of change of data in the data throughput.

11. The method of claim 10, further comprising adjusting a frequency in determining the data loss rate based on analyzing the one or more characteristics of the datastream between the first node and the second node.

12. At least one non-transitory computer readable storage medium having computer executable instructions stored thereon that, when executed by a computing platform, operate to:
   determine a data loss rate pertaining to a datastream between a first node and a second node, wherein the datastream comprises data packets sent and received between the first node and the second node;
   cause the first node and the second node to send to and receive from each other data packets encoded using random linear network coding in response to determining that the data loss rate is higher than or equal to a first threshold; and
   cause the first node and the second node to stop sending and receiving data packets encoded using random linear network coding between each other in response to determining that the data loss rate is lower than at least one additional threshold, wherein the first threshold and the one additional threshold are set to data loss rates that balance performance of applications with maintaining higher data throughput rates.

13. The computer-readable storage medium of claim 12, wherein the first threshold is greater than the at least one additional threshold.

14. The computer-readable storage medium of claim 12, comprising further instructions that, when executed, cause a system to determine whether the first node possesses valid authorization, and causing the first node and the second node to send and receive data packets encoded using random linear network coding to each other in response to determining that the first node possesses valid authorization.

15. The computer-readable storage medium of claim 12, comprising further instructions that, when executed, cause a system to cause the first node and the second node to stop sending and receiving data packets encoded using random linear network coding between each other in response to determining that the first node lacks valid authorization.

16. The computer-readable storage medium of claim 12, comprising further instructions that, when executed, cause a system to record one or more characteristics of the datastream between the first node and the second node.

17. The computer-readable storage medium of claim 16, comprising further instructions that, when executed, cause a system to adjust a frequency in determining the data loss rate based on analyzing the one or more characteristics of the datastream between the first node and the second node.

* * * * *